Aug. 25, 1953     R. L. McILVAINE ET AL     2,649,924
APPARATUS FOR COLLECTING DUST
Filed Nov. 12, 1949
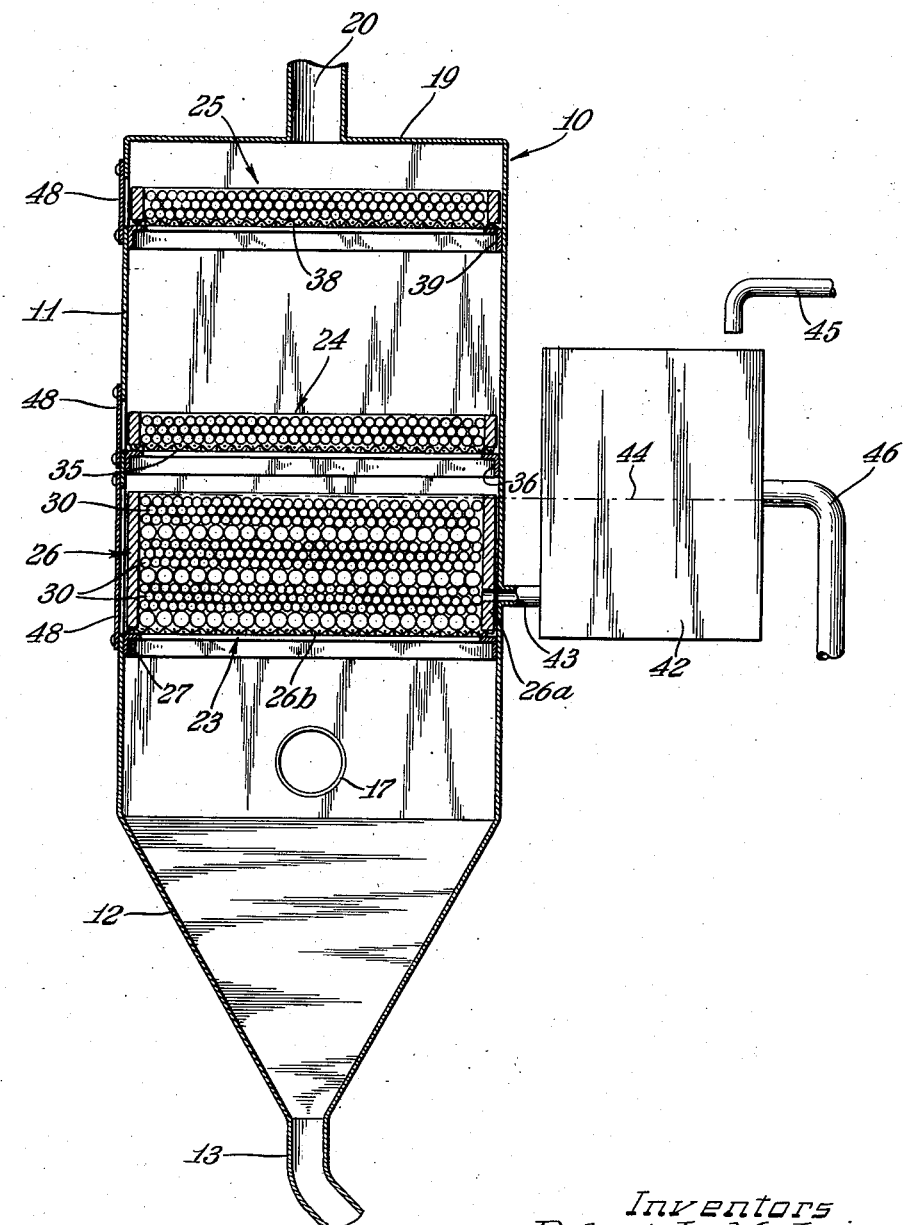
Inventors
Robert L. McIlvaine
James L. Yates
by The Firm of Charles w Hills    Attys Patented Aug. 25, 1953

2,649,924

UNITED STATES PATENT OFFICE 2,649,924

APPARATUS FOR COLLECTING DUST

Robert L. McIlvaine and James L. Yates, Glencoe, Ill., assignors, by mesne assignments, to Herbert Simpson Corporation, Chicago, Ill., a corporation of Illinois Application November 12, 1949, Serial No. 126,852

8 Claims. (Cl. 183—15)

The present invention relates to improvements in an apparatus for dust collection. More particularly, it refers to improvements in dust collectors wherein dust particles are separated from an air stream by bubbling the dust-laden air up through a liquid bath.

It is, therefore, an important object of the present invention to provide a dust collector in which air is bubbled up through a liquid bath and the dust separated therefrom by the above-mentioned three-fold method.

Another object of this invention is to provide a dust collector in which air is bubbled up through a constantly changing controlled liquid bath which is maintained at a constant level.

A still further object of this invention is to provide a dust collector having dust removal elements which are readily replaceable and adjustable to obtain varying conditions of efficiency of dust removal and pressure losses through the unit.

An important object of this invention is to provide a dust collector having a liquid turbulence chamber in which a portion of the liquid is permitted to escape to a sump to carry off dust and clean off the filtering elements in the chamber while the height of liquid is kept constant by replenishing the chamber from a supply of clean water.

Another object of this invention is to provide a dust collector having a removable filtering unit which may be easily cleaned.

It is an important feature of this invention to provide a dust collector in which there is provided an auxiliary liquid supply chamber in flow communication with the dust-removing chamber of the dust collector for maintaining a constant head of liquid in the dust-removal chamber and for supplying constantly controlled fresh liquid to the dust chamber.

Other and further features, objects and advantages of the present invention will become apparent to one skilled in the art from the following detailed description taken in connection with the accompanying drawing.

On the drawing:

The sole figure is a fragmentary vertical sectional view taken centrally through a dust collector constructed according to the principles of the present invention.

As shown on the drawing:

When dust-laden air is introduced through the bottom of a contacting unit containing a liquid, bubbles are formed as the air passes upwardly through the liquid. Part of the dust contacts the liquid and is wetted. On reaching the surface, the bubbles burst and the air escapes, leaving part of the original dust load in the liquid. An additional portion of the original dust load is trapped by flying liquid particles and also remains with the liquid. Another portion of the dust remains in suspension in the air and thus escapes entrapment. If this dust-laden air from the breaking bubble is caused to impinge on a wetted surface, further entrapment of the dust takes place. Thus, the dust collecting method of the present invention embodies three distinct methods of separation, namely:

(a) by adhesion of the dust to the wall of the bubble and subsequent discharge to a drain; (b) by entrapment of the dust by flying liquid particles after the bubbles burst; (c) by impingement of the remaining dust particles on a wetted surface.

According to the principles of the present invention a series of liquid-filled contacting units are arranged one above the other so as to permit dust-laden air to pass upwardly through each contacting unit in turn. Each contacting unit is made up of three layers of small spheres approximately ⅜ inch in diameter supported on one layer of large spheres, approximately one inch in diameter. In a preferred embodiment three of such contacting units are disposed one above the other with the lower contacting unit supported on an open grid structure. A constant head of clean liquid is continuously maintained in the chamber carrying the contacting unit so that the water level in the contacting unit is always constant. Thus, with a constant velocity and pressure of air entering the dust collector, air bubbles will form at the lower portion of the first contacting unit and pass upwardly therethrough and burst in the spaces between the large spheres at the lower portion of the second contacting unit. Bubbles will re-form in the second contacting unit, pass upwardly therethrough and burst in the space between the large spheres of the third contacting unit. Bubbles will again form in the third contacting unit and pass upwardly therethrough and burst at the top surface thereof into a chamber defined between the top surface of the third contacting unit and an auxiliary contacting unit disposed across the chamber approximately two inches above the third contacting unit. Thus, at the top of each contacting unit, the bubbles burst and the dust is separated from the air by the adhesion of the dust to the liquid, by the entrapment of the dust by flying liquid particles as the bubbles burst, and by impingement of the dust on the wetted surfaces provided by the contacting unit immediately thereabove.

In the drawing the reference numeral 10 indicates a housing made preferably of heavy gauge sheet metal such as steel and having an upper body portion 11 of generally rectangular cross-section and a lower discharge portion tapered inwardly to form a sump 12. A lower tubular extension 13 on the sump is provided for the discharge of dust-laden water from the dust-removal chamber defined by the body portion 11. The dust may be separated in a settling tank or the like and, if desired, the water may be recirculated through the dust collector.

Air from which dust is to be removed is brought into the housing 10 through an inlet pipe, or conduit 17, which suitably enters the housing near the lower end of the body portion 11. The housing 10 has a top wall 19 with an air discharge pipe 20 extending therefrom.

Disposed across the passage defined by the body portion 11 are three dust-removal units 23, 24 and 25. The lower unit 23 comprises a tray 26 which is substantially of the same configuration as the body portion 11 and is arranged to telescope inside the housing and to be supported on angle members 27 which are secured, as by welding, to the walls of the housing. The tray 26 has four upstanding side walls 26a, a bottom wall 26b of wire mesh or of some other perforated material that provides a grid-like structure having a plurality of openings through which water and air may easily pass. As illustrated in the drawing, the bottom wall is made of wire mesh which provides a relatively flexible bottom wall.

Disposed in the tray 26 are three "vessels" or contacting units 30 disposed one above the other, each vessel comprising three layers of small spheroids supported on one layer of large spheroids. These spheroids may be made of any hard smooth material such as round stones or glass spheres. Preferably the spheroids are made of material having non-corrosive and non-abrasive surfaces.

The unit 24 includes a tray 35 having upstanding side walls and a grid-like open bottom wall and supported on angle members 36 secured to the walls of the housing. Three layers of small spheroids are disposed in the tray 35.

The unit 25 is identical to the unit 24 and comprises a tray 38 having a grid-like bottom and upstanding side walls supported on angle members 39 from the side of the housing.

Liquid is supplied to the unit 23 by means of a storage chamber 42 which is disposed adjacent the housing 10 and is in flow communication with the unit 23 by means of a conduit 43 which is connected into the housing 10 and through a passage in the side wall of the tray 26 substantially opposite the upper end of the lower vessel in the unit 23 as shown in the drawing. The passage may be made up of a plurality of small openings or a large opening covered by a screen to prevent escape of the spheres. Liquid is constantly furnished to the tank 42 through a supply pipe 45. An overflow pipe 46 is connected to the wall of the tank 42 to maintain the level of water in the tank 42 at a constant height. It will be understood, of course, that by means of the tank 42 the height of liquid in the unit 23 may be maintained constant, and it will, of course, correspond to the height of liquid in the vessel 42. As shown in the drawing, by dot-dash line 44, the liquid level in the tank 42 is substantially opposite the top of the unit 23. Thus, the water level in the unit 23 will be maintained at the top of the unit. If it is desired to bring this level downwardly, the level in the tank 42 may be changed by shifting the overflow pipe 46.

Access doors 48 are provided in one wall of the housing opposite the units 23, 24 and 25 so that the units may be slid out of the housing for cleaning and maintenance purposes.

In operation, air is supplied into the housing by a constant speed blower and the air moves upwardly through the units 23, 24 and 25. As previously explained, bubbles will form in the lowest vessel of the unit 23 and will burst in the bottom of the second vessel in the space between the large spheres therein. Bubbles forming in the second vessel will burst into spaces provided by the large spheres of the third vessel, and bubbles forming in the third vessel will burst at the upper surface of the third vessel into the space defined between the upper surface of the unit 23 and the lower surface of the unit 24. The unit 24, therefore, will provide a wetted surface against which dust will impinge. Thus, in each of the three vessels dust will be separated from dust-laden air by adhesion to the wall of the bubble, by entrapment by flying liquid particles as the bubbles burst, and by impingement on the wetted surface thereabove. It will be understood, of course, that the air velocity and the liquid head in the unit 23 are so controlled as to permit a small volume of liquid to constantly escape to the bottom of the vessel to the sump and thus clean off the arrested dust.

The water supplied to the unit 23 must be in such quantity and at such controlled constant rate that it will be adequate to carry away the dust and dirt removed from the upwardly moving air. In other words, the water cannot be allowed to accumulate since, if it did, it would become saturated with dirt and would lose its efficacy as a medium of conveying away the dust and dirt freed from the air in the course of the upward travel of the air through the unit 23.

The unit 24 acts to define the chamber above the unit 23 and provides a wetted surface against which dust particles impinge and are separated out of the air. The spheres in the unit 24 also provide a wetted surface which takes water and dust from the air.

The unit 25 is an auxiliary unit which separates out any remaining dust and moisture which may still be in the air as it reaches the top of the collector.

Thus, there is provided in this invention a novel dust collector which separates dust from dust-laden air by a three-fold action as the dust is bubbled up through a liquid bath. A special feature of this invention is the provision of means for maintaining a head of liquid in the turbulent bubbling chamber at constant height.

It will be understood that modifications and variations may be effected without departing from the scope of the novel concepts of the present invention.

We claim as our invention:

1. A dust collector comprising a housing having an air inlet and an air outlet connection with an air passageway therebetween, a tray having a perforate bottom supported across said passageway, a plurality of contacting units disposed in superimposed relation in said tray, each vessel including a plurality of small spheres supported on large spheres, means for maintaining a liquid bath around said contacting units at a constant level, and means for forcing air through said contacting units to the outlet connection.

2. A dust collector comprising a housing having an air inlet and an air outlet connection with an air passageway therebetween, a first tray having a perforate bottom supported across said passageway, a plurality of contacting units disposed in superimposed relation in said first tray, each contacting unit including a plurality of small spheres supported on large spheres, means for maintaining a liquid bath around said contacting units at a constant level, means for forcing air through said contacting units through the outlet connection, and a second tray disposed across said air passageway above said first tray, and spheres in said second tray providing a plurality of surfaces wetted by bubbles bursting therebelow against which dust may impinge.

3. A dust collector comprising a housing having an air inlet and an air outlet connection with an air passageway therebetween, a first tray disposed across said passageway having an open grid-like bottom wall, a plurality of contacting units disposed in superimposed relation in said first tray, each contacting unit including a plurality of small spheres supported on large spheres, means for maintaining a liquid bath around said contacting unit at a constant level, a second tray supported across said passageway and spaced above said first tray, a plurality of elements disposed in said second tray arranged to be wetted by bubbles bursting therebelow and providing a plurality of surfaces against which dust may impinge as it leaves said first tray, a third tray disposed across said passageway and spaced above said second tray having a perforate bottom, and a plurality of filtering elements disposed in said third tray and arranged to remove globules of liquid in the air after it leaves said second tray.

4. A dust collector comprising a housing having a gas inlet and a gas outlet with a gas passageway therebetween, a constant level liquid bath in said passageway, a plurality of superimposed particulated strata in said bath, each of said strata being composed of a plurality of layers, each layer having particles regularly arranged and of the same dimensions whereby resistance to flow of gas through each layer is substantially uniform over the entire area thereof, and at least one of the layers of each strata being composed of particles of larger size than the particles of other layers of the strata, the particles of each layer contacting particles of adjacent layers and supporting layers thereabove, said larger size particles defining with adjacent layers a plurality of bubble-bursting interstices and said other layers defining therebetween bubble-forming interstices.

5. A dust collector comprising a housing having a gas inlet and a gas outlet connection with a gas passageway therebetween, a tray having a perforate bottom extending across said passageway intermediate said inlet and outlet, a plurality of layers of spheroids on said tray, each layer having spheroids regularly arranged and of the same dimensions, and at least one of said layers being composed of spheroids of larger size than the spheroids of other layers, the spheroids of each layer contacting particles of adjacent layers and supporting layers thereabove, said larger spheroids defining with adjacent layers relatively large bubble-bursting interstices, and said other layers of spheroids defining therebetween relatively smaller bubble-forming interstices, said layer of larger size spheroids being superimposed upon layers of smaller size spheroids.

6. A dust collector comprising a housing having a gas inlet and a gas outlet with a gas passageway therebetween, a constant level liquid bath in said passageway, a plurality of superimposed particulated strata in said bath, each of said strata being composed of a plurality of layers, each layer having particles regularly arranged and of the same dimensions whereby resistance to flow of gas through each layer is substantially uniform over the entire area thereof, and at least one of the layers of each strata being composed of particles of larger size than the particles of other layers of the strata, the particles of each layer contacting particles of adjacent layers and supporting layers thereabove, said larger size particles defining with adjacent layers a plurality of bubble-bursting interstices and said other layers defining therebetween bubble-forming interstices, all of said particles being of circular cross-section.

7. A dust collector comprising a housing having a gas inlet and a gas outlet connection with a gas passageway therebetween, a tray having a perforate bottom extending across said passageway intermediate said inlet and outlet, a plurality of layers of spheroids on said tray, each layer having spheroids regularly arranged and of the same dimensions, and at least one of said layers being composed of spheroids of larger size than the spheroids of other layers, the spheroids of each layer contacting particles of adjacent layers and supporting layers thereabove, said larger spheroids defining with adjacent layers relatively large bubble-bursting interstices, and said other layers of spheroids defining therebetween relatively smaller bubble-forming interstices, said layer of larger size spheroids being superimposed upon layers of smaller size spheroids, a second tray supported across said passageway above and in closely spaced relation to said first-mentioned tray, and a plurality of layers of spheroids in said second tray arranged to be wetted by bubbles bursting therebelow and providing wet surfaces against which dust-laden gas leaving said first-mentioned tray will impinge.

8. A dust collector comprising a housing having a gas inlet and a gas outlet with a gas passageway therebetween, a constant level liquid bath in said passageway, a plurality of superimposed particulated strata in said bath, each of said strata being composed of a plurality of layers, each layer having particles regularly arranged and of the same dimensions whereby resistance to flow of gas through each layer is substantially uniform over the entire area thereof, at least one of the layers of each strata being composed of particles of larger size than the particles of other layers of the strata, the particles of each layer contacting particles of adjacent layers and supporting layers thereabove, said larger size particles defining with adjacent layers a plurality of bubble-bursting interstices and said other layers defining therebetween bubble-forming interstices, a water storage chamber adjacent said housing in flow communication with the bath in said housing, a conduit connected into said housing at the level of said bath and communicating with said water storage chamber, and means for maintaining the level of water in said chamber substantially constant to correspondingly maintain the level of water in said bath.

ROBERT L. McILVAINE.
JAMES L. YATES.

References Cited in the file of this patent

UNITED STATES PATENTS

| Number | Name | Date |
|---|---|---|
| 652,773 | Hirt | July 3, 1900 |
| 1,257,400 | Robinson | Feb. 26, 1918 |
| 1,910,386 | Garrett | May 23, 1933 |
| 2,000,444 | Hechenbleikner | May 7, 1935 |
| 2,000,706 | Lowther | May 7, 1935 |
| 2,453,447 | McKeown | Nov. 6, 1948 |

FOREIGN PATENTS

| Number | Country | Date |
|---|---|---|
| 4,106 | Great Britain | Mar. 7, 1891 |
| 594,488 | France | June 22, 1925 |
| 867,248 | France | July 7, 1941 |